United States Patent [19]
Boland et al.

[11] Patent Number: 5,179,976
[45] Date of Patent: Jan. 19, 1993

[54] FLUID COUPLING

[75] Inventors: John D. Boland; Paul J. Fournier; John C. Field, all of Jackson, Mich.; David S. Densel, Convoy, Ohio

[73] Assignee: Aeroquip Corporation, Jackson, Mich.

[21] Appl. No.: 811,609

[22] Filed: Dec. 23, 1991

[51] Int. Cl.$^5$ .............................................. F16L 37/28
[52] U.S. Cl. ........................... 137/614.06; 251/149.9; 285/27; 285/316; 137/614.04
[58] Field of Search .................... 285/27, 28, 316; 137/614.04, 614.06; 251/149.9

[56] References Cited

U.S. PATENT DOCUMENTS

| | | | |
|---|---|---|---|
| 3,096,135 | 7/1963 | Feustel . | |
| 3,254,673 | 6/1966 | MacKenzie | 137/614.06 |
| 3,287,031 | 11/1966 | Simmons et al. | 285/27 |
| 3,314,447 | 4/1967 | Collar et al. | 285/316 |
| 4,280,723 | 7/1981 | Moldestad | 285/376 |
| 4,662,396 | 5/1987 | Avnon | 251/149.9 |
| 4,665,960 | 5/1987 | Brezezicki et al. | 285/18 |
| 4,792,162 | 12/1988 | Medvick | 285/316 |
| 4,804,207 | 2/1989 | Berchem et al. | 285/16 |
| 4,804,208 | 2/1989 | Dye | 285/26 |

Primary Examiner—A. Michael Chambers
Attorney, Agent, or Firm—Emch, Schaffer, Schaub & Porcello Co.

[57] ABSTRACT

A fluid coupling is disclosed. The fluid coupling includes first and second coupling parts which define a passageway. A valve is provided in the passageway. The valve is adapted to open upon interconnection of the coupling parts. One of the coupling parts includes at least one guide groove, while the other coupling part includes at least one key pin receivable by the guide groove. The coupling parts can only be interconnected upon alignment of the key pin with the guide groove.

5 Claims, 2 Drawing Sheets

FLUID COUPLING

BACKGROUND OF THE INVENTION

The present invention relates to a fluid coupling and particularly to a two-part or two piece fluid handling coupling. Fluid couplings of this type are often used to join conduits together. For example, low spill hydraulic lines may be connected together with a two-part fluid handling coupling. In the chemical industry, fluid couplings are used to join conduits or hoses to fill and dispense chemicals from tanks.

The primary objective of the present invention is to provide an improved fluid coupling which includes a keying system to ensure that only the correct male coupling part or half can be connected to the mating female coupling part or half. This prevents cross-mixing of fluids.

SUMMARY OF THE INVENTION

The present invention is directed to a fluid coupling having interconnectable male and female coupling parts or halves. Each of the coupling parts includes a coupling connection end and an axial passageway. The coupling parts include a valve adapted to open upon interconnection of the male and female coupling parts. One of the coupling parts includes at least one guide groove. The other of the coupling parts includes at least one key pin receivable by the guide groove. The key pin and guide groove must be aligned to interconnect the parts. If there are insufficient guide grooves or if the guide grooves are not in correct circumferential alignment with the key pins, the coupling parts cannot be interconnected. The fluid coupling, according to the present invention, ensures that the correct coupling parts are joined together and tends to prevent conduit or container connections which are improper.

DESCRIPTION OF THE PREFERRED EMBODIMENT

Figures 1, 2:
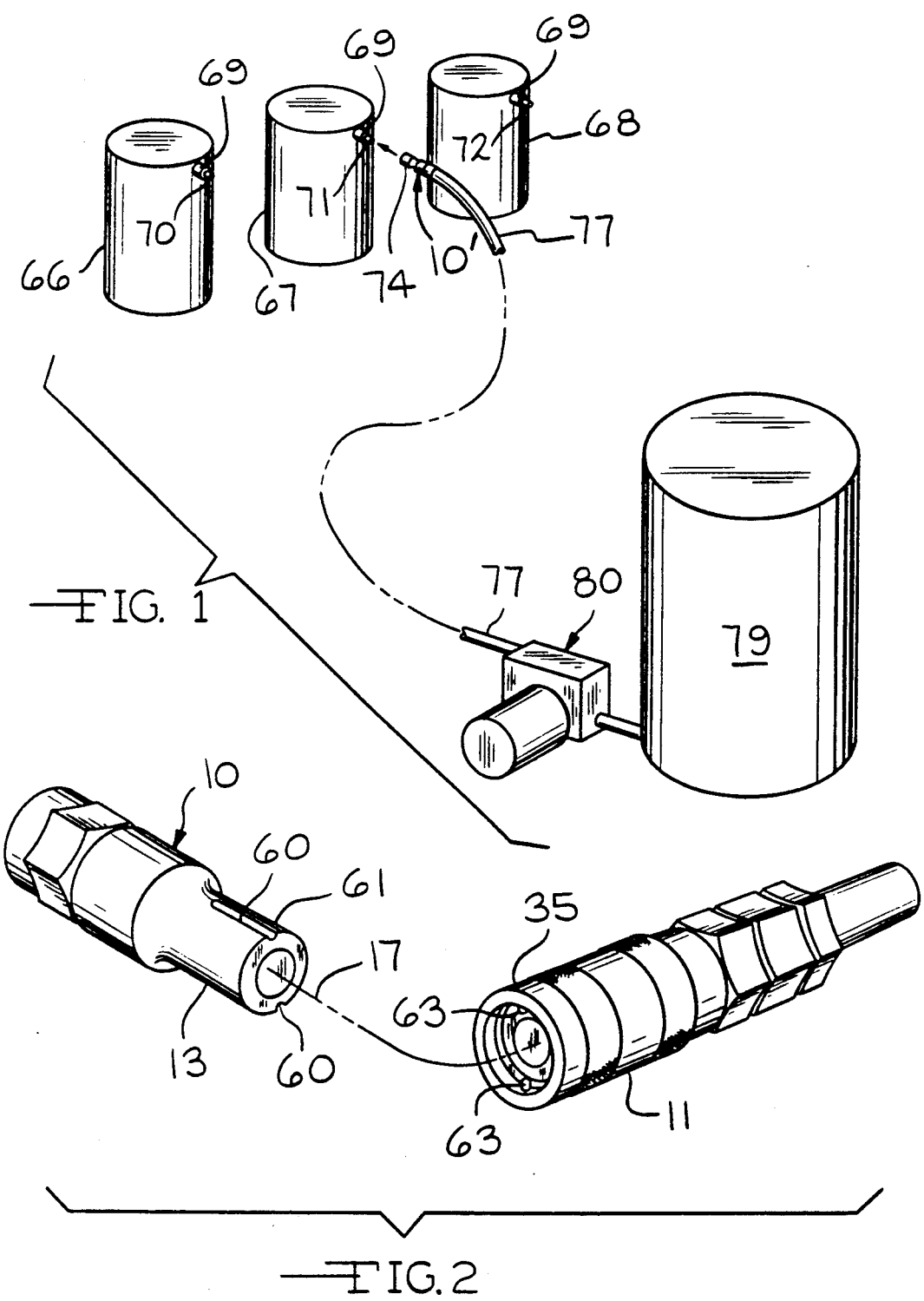
FIG. 1 is a diagrammatic perspective view of a fluid coupling, according to the present invention, utilized in a chemical supply system.
FIG. 2 is an exploded, perspective view showing the male coupling part and the female coupling part of a fluid coupling, according to the present invention, in a disengaged position.

Referring to the drawings, a fluid coupling, according to the present invention, is generally indicated by the reference number 10. The fluid coupling 10 is described in detail below. Another embodiment of a fluid coupling, similar to the fluid coupling 10, is disclosed in the assignee's U.S. pat. application No. 07/726,031 filed July 5, 1991 now U.S. Pat. No. 5,123,446 issued Jun. 23, 1992. That disclosure is incorporated herein by reference.

The fluid coupling 10 includes first and second coupling parts. The parts include an interconnectable female coupling part 11 and an interconnectable male coupling part 13.

Figure 3:
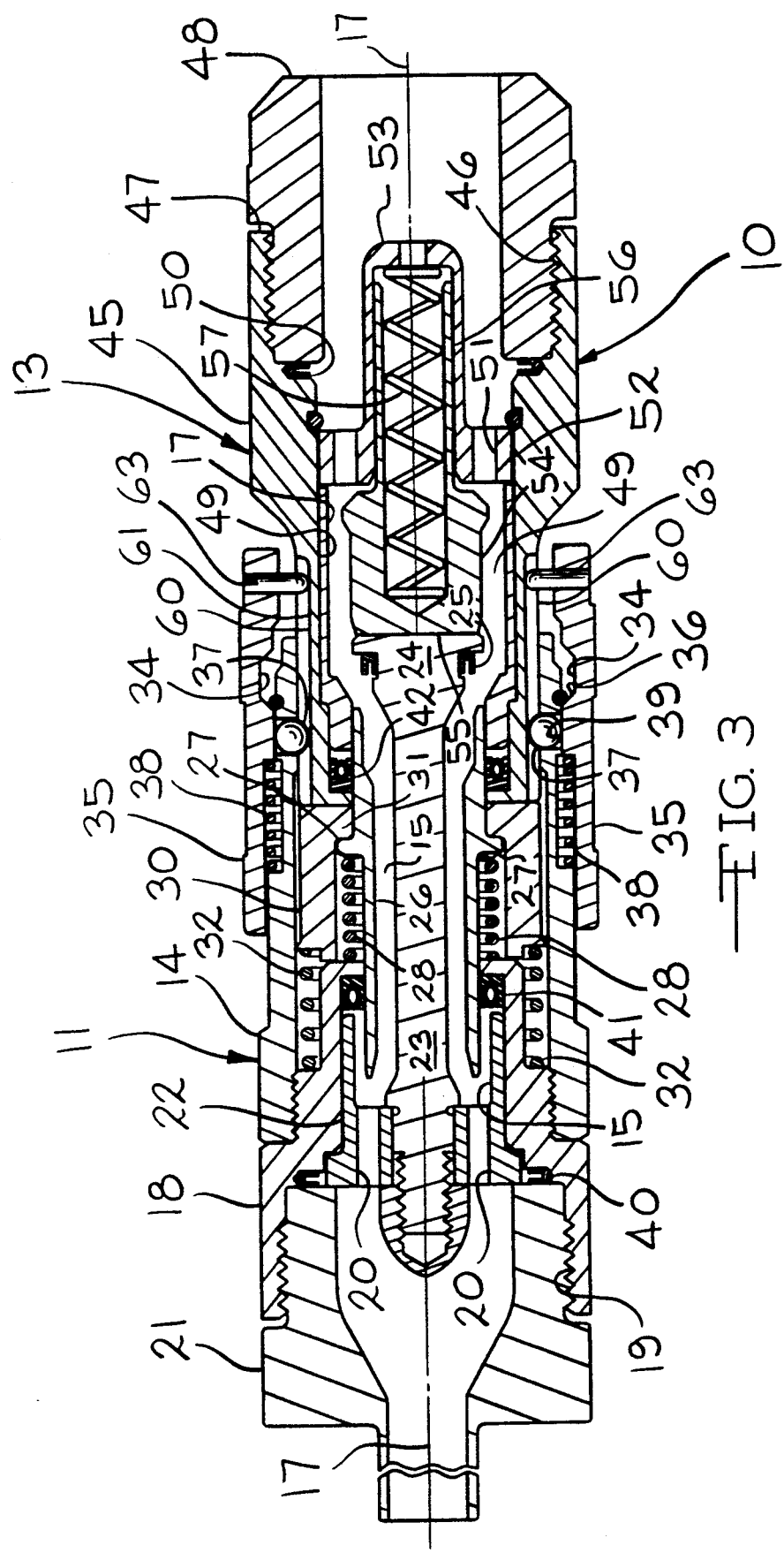
FIG. 3 is an enlarged cross-sectional view of a fluid coupling, according to the present invention, and showing the male and female coupling parts in the engaged position.

The female part 11 includes an outer tube 14. A longitudinal passageway 15 is defined within the tube 14 and is generally parallel with a longitudinal axial centerline 17. An adaptor 18 is threadably connected to the tube 14. Threads 19 of the adaptor 18 permit the female coupling part 11 to be connected to a tool fitting or to a conduit, for example a tube fitting 21, as shown in FIG. 3.

A spider 22 is mounted within the passageway 15 and is provided with openings 20 whereby fluid may flow therethrough. The spider 22 supports a valve stem 23 which terminates at a valve head 24. A seal 25 is positioned adjacent the valve head 24.

A tubular valve sleeve 26 is reciprocally mounted within the passageway 15 and surrounds the valve stem 23. The valve sleeve 26 includes an outwardly extending shoulder 27. A compression spring 28 engages the shoulder 27 and urges the valve sleeve 26 toward the right, as shown in FIG. 3.

An annular detent sleeve 30 surrounds the valve sleeve 26 and includes an inwardly directed shoulder 27. The detent sleeve 30 is positioned between the tube 14 and the valve sleeve 26 and functions as a lost-motion means for operating the valve sleeve 26. A compression spring 32 biases the detent sleeve 30 toward the right, as shown in FIG. 3.

The connecting or locking of the parts of the connector parts 11 and 13 together is accomplished by an annular lock collar 35 which is reciprocally mounted on the tube 14. The lock collar 35 includes an internal groove 34 defining an inclined surface 36. Detent balls 37 are biased inwardly into engagement with the detent sleeve 30 by the biasing force of a compression spring 38 which tends to move the lock collar 35 to the right, as shown in FIG. 3. When the fluid coupling 10 is in the connected position, as shown in FIG. 3, the detent balls 37 are positioned in a groove 39 and the lock collar 35 is moved to the position, shown in FIG. 3, to maintain the female and male parts 11 and 13 in the locked or interconnected mode, shown in FIG. 3.

A seal 40 is positioned adjacent the spider 22, to provide a seal with the tube fitting 21. Seals 41 and 42 are provided in a surrounding and opposed relationship with the valve sleeve 26.

The male coupling part 13 includes a generally tubular body 45 which defines internal threads 46 adjacent an outer end 47. In the present embodiment, a tube fitting 48 is threadably connected to the outer end 47 of the tubular body 45. Various types of fittings may be utilized other than the fitting 48.

The tubular body 45 defines a longitudinally extending axial passageway 49. The passageway 49 is in alignment with the passageway 15 of the female coupling part 11 to provide an overall passageway through the entire fluid coupling 10. A seal 50 is provided adjacent the inner end of the tube fitting 48.

A spider 52 is located within the passageway 49 of the tubular body 45 and defines a plurality of fluid passageways 51 whereby fluid may pass through the spider 52. The spider 52 also defines an elongated spider bore 53. A poppet valve 54, having an outer end 55 and a tubular shank 56, is mounted adjacent the spider 52. The tubular shank 56 of the poppet valve 54 is mounted for reciprocation within the spider bore 53. A compression spring 57 urges the outer end 55 of the poppet valve 54 to the left, as shown in FIG. 3.

Referring to FIGS. 2 and 3, an important feature of the present invention is a keying assembly. In the present embodiment, a plurality of grooves, namely two guide grooves 60 are located on a nose surface 61 of the male connector part 13. In the present embodiment, the guide grooves 60 are located in a diametrically opposed relationship, 180° apart from one another. However, the number of grooves and their circumferential positioning with respect to the nose surface 61 may be varied and still fall within the scope of the present invention. The guide grooves 60 are parallel to the centerline 17 of the coupling parts 11 and 13.

Key pins 63 are positioned on the second part of the fluid coupling 10. In other embodiments, the grooves can be placed in the female part while the keys are placed in the male part. In the present embodiment, the key pins 63 are mounted on the annular lock collar 35 of the female coupling part 11. Two key pins 63 are provided and extend inwardly perpendicular to the centerline 17 of the respective coupling parts 11 and 13.

Referring to FIG. 2, when the coupling parts 11 and 13 are in a disconnected mode, in order to connect the parts, the key pins 63 must be received by aligned grooves 60. In the present embodiment, as indicated in FIG. 2, the diametrically opposed key pins 63 are suitable for alignment with the two diametrically opposed guide grooves 60. Therefore, as shown in FIG. 3, the first and second coupling parts 11 and 13 may be moved from the disconnected position shown in FIG. 2, where the valving is closed, to the connected position shown in FIG. 3, where the valving is open and the fluid passageways 15 and 49 are aligned allowing fluid to pass through the connected fluid coupling 10.

The fluid coupling 10 of the present invention requires at least one lock pin 63 and at least one mating guide groove 60. However, as mentioned above, the location of the guide grooves and the lock pins may be reversed with respect to the female and male connectors, and still fall within the scope of the present invention. In addition, there can be a varying plurality of lock pins and connectors. There always must be sufficient aligned guide grooves to mate with the number of lock pins provided in order to permit the fluid coupling 10 to be connected. However, there may be additional guide grooves provided in excess of the number of lock pins provided. In addition, the circumferentially positioning of the lock pins and guide grooves may be varied. For example, rather than having the locking pins at twelve o'clock and six o'clock, as shown in FIG. 2, the pins could be, for example, at twelve o'clock and two o'clock. Or in the alternative, four pins could be provided. One each located at twelve o'clock, three o'clock, six o'clock and nine o'clock, with corresponding aligned grooves on the other connector part.

Referring to FIG. 1, a use of a fluid coupling 10', according to the present invention, is diagrammatically illustrated. Three chemical containers 66, 67 and 68 are indicated. The three containers 66, 67 and 68 contain chemical solutions which are different from one another. Each of the containers 66–68 includes a conduit 69 which mount respective first coupling parts 70, 71 and 72, according to the present invention. In the present embodiment, the first coupling parts 70–72 are female coupling halves and each has a different number or circumferential alignment of key pins. These first coupling parts 70–72 mate with second coupling parts, which are male coupling halves. A second coupling part 74 is attached to a conduit supply line 77 and includes guide grooves which are of the correct number and alignment of the first coupling part 71. A supply container 79 is connected through a pump and motor assembly 80 to the conduit supply line 77. The supply container 79 contains the same chemical solution which is desired in the container 67. Because the second coupling 74 will only mate with the first coupling part 71 of the container 67 and will not mate with the first coupling parts 70 and 72 of the containers 66 and 68, the supply container 79 can only be connected to the correct container 67. In other embodiments, the coupling part connected to the container is mounted on the top of the container.

The use shown in FIG. 1 is only one use of the fluid coupling 10, according to the present invention. The fluid coupling, according to the present invention, may also be used in connection with tool supply systems where fluid conduits under specified fluid pressures are desired for certain tools. Again, the key system, found in the fluid couplings, according to the present invention, ensure that a proper connection is made. While the present invention may be utilized in high pressure systems, most applications fall within a low pressure field for the chemical industry with operating pressures generally in the range of 10 psig to 100 psig.

Many modifications and revisions may be made to the fluid coupling, disclosed in the present application without departing from the spirit and the scope of the present invention and of the following claims.

We claim:

1. A fluid coupling comprising, in combination, first and second coupling parts, each of said first and second coupling parts including a coupling connection end and a passageway, said first and second parts including a valve within the passageway adapted to open upon interconnection of said first and second coupling parts, said first coupling part comprising a male coupling part having a nose surface defining at least one guide groove, said second coupling part comprising a female coupling having at least one key pin extending inwardly and receivable by said guide groove, whereby said coupling parts can be interconnected upon alignment of said key pin with said guide groove and whereby said coupling parts cannot be interconnected without alignment of said key pin within guide groove.

2. A fluid coupling, according to claim 1, wherein said one of said first and second coupling parts includes a plurality of circumferentially spaced guide grooves and said other of said first and second coupling parts includes a plurality of key pins circumferentially positioned for reception by said guide grooves.

3. A fluid coupling, according to claim 1, wherein said one of said first and second coupling parts includes two spaced guide grooves and said other of said first and second coupling parts includes two key pins spaced for reception by said two guide grooves.

4. A fluid coupling, according to claim 1, wherein each of said key pins extends in a direction perpendicular to the longitudinal centerline of said other one of said first and second coupling parts and said guide grooves extend in a direction parallel to the longitudinal centerline of said one of said first and second coupling parts.

5. A fluid coupling comprising, in combination, male and female coupling parts, each of said male and female coupling parts including a coupling connection end and an axial passageway, said male and female parts including a valve within the passageway adapted to open upon interconnection of said male and female coupling parts, said male coupling part having a nose surface defining at least one guide groove, said female part defining a recessed opening at one end, including at least one key pin extending inwardly within such recessed opening and receivable by said guide groove, whereby said male and female coupling parts can be interconnected upon alignment of said key pin with said guide groove and whereby said male and female coupling parts cannot be interconnected without alignment of said key pin within said guide groove.

* * * * *